US005522578A

United States Patent [19]

Mayfield

[11] Patent Number: 5,522,578

[45] Date of Patent: Jun. 4, 1996

[54] OUTBOARD MOTOR BRACKET CONTROLLING DEVICE

[76] Inventor: Gary J. Mayfield, 142 E. Market, Daly City, Calif. 94014

[21] Appl. No.: 304,707

[22] Filed: Sep. 12, 1994

[51] Int. Cl.[6] .................. F16M 7/00

[52] U.S. Cl. .................. 248/642; 248/669; 248/284.1; 440/63

[58] Field of Search .................. 248/642, 640, 248/669, 284; 440/63, 900

[56] References Cited

U.S. PATENT DOCUMENTS

| | | | |
|---|---|---|---|
| 2,138,600 | 11/1938 | Harmon | 248/284 X |
| 2,782,744 | 2/1957 | Staley | 248/642 X |
| 2,979,017 | 4/1961 | Soper | 440/63 |
| 3,032,304 | 5/1962 | Machlan | 248/284 X |
| 3,426,723 | 2/1969 | Specht | 440/63 |
| 3,461,832 | 8/1969 | Vierling | 248/642 X |
| 3,648,645 | 3/1972 | Ezell | 440/63 |
| 4,881,734 | 11/1989 | Nye | 248/284 X |

*Primary Examiner*—Leslie A. Braun
*Assistant Examiner*—Brian J. Hamilla
*Attorney, Agent, or Firm*—Robert Charles Hill

[57] ABSTRACT

A device for controlling an articulating outboard motor bracket is provided. A mounting bracket is affixed to an inner side of a boat's transom. The mounting bracket includes a pair of mounting plates that extend above a top edge of the transom. A lever arm has a first end that is pivotally affixed to the mounting plates. A lever member has an arcuate region that extends from a first end toward a second end thereof. The first end of the lever member is pivotally coupled to the lever arm. The lever member couples to the lever arm at a point proximal to an arcuate portion of the lever arm. A pair of coupling plates pivotally couple the lever member to the lever arm and hold the lever member in axial alignment with the lever arm. A pair of connecting plates pivotally connect a second end of the lever member to a lifting member on the articulating bracket. The lever arm is rotated toward the articulating outboard motor bracket, to lower the bracket into an operating position. The lever arm is rotated away from the bracket, to lift the bracket into a transit position.

5 Claims, 6 Drawing Sheets

OUTBOARD MOTOR BRACKET CONTROLLING DEVICE

BACKGROUND OF THE INVENTION

1. Field of the invention

The present invention relates generally to devices used to secure outboard motors to boats, and more particularly, to an improved device for controlling an articulating outboard motor bracket.

2. Description of Related Art

Devices used to raise and lower small outboard motors, such as trolling motors, are known in the art. These devices are typically designed to raise the motor from a retracted position on the deck of a boat, and lower the motor to an operating position in the water.

U.S. Pat. No. 4,966,566, to Baird, discloses a spring-biased mechanism for raising a motor from a retracted position on the deck of a boat, and lowering the motor to an operating position in the water. The disclosed mechanism connects to a trolling motor mount. The mechanism partially counterbalances the weight of the trolling motor, as the motor is pivoted from an intermediate position into an operating position. The mechanism includes a foot element that is pivotally attached at one end to the motor mount. A linear-acting spring unit has one end pivotally attached to one end of the foot element and means that pivotally connect the opposite end of the foot element to a portion of the spring unit. The spring unit includes an arm that is coupled to the motor mount and cooperates with a spring mechanism to pivot the motor into the water.

A disadvantage of prior art devices, is they are designed for use with boats having substantially shallow hulls, such as recreational fishing boats. The arms of the prior art can only be lowered until they abut the boat's deck. On boats with substantially tall transoms, the arms abut the boats's deck, as the motor is being lowered into the water, prior to the motor being in an operating position in the water.

Recreational sail boats are often equipped with a low horsepower outboard motor to propel the sail boat in calm-wind conditions, or through harbors for example. When the sail boat is sailing, it is desirable to lift the outboard motor completely out of the water to reduce drag on the sail boat. During a single sailing cruise, it may be necessary to raise and lower the motor several times.

The outboard motor is typically coupled to a bracket which is mounted on an outer wall of the boat's transom. Since sail boats have substantially tall transoms, they are often fitted with a bracket that includes an articulating joint. The articulating bracket enables the outboard motor to be lowered completely into, and raised completely out of, the water.

The outboard motor is raised, or lowered, by the user first leaning over the transom, then manually grasping a pull handle on the outboard motor. The motor can then be raised or lowered, as desired.

A disadvantage of manually raising or lowering the motor, is that the motor is substantially heavy. Repeatedly lifting the motor could cause harm to the user's back or shoulders, for example. A further disadvantage of manually raising or lowering the motor, is that it is somewhat dangerous. A user could accidentally fall overboard when raising or lowering the motor. There is, therefore, a need for a device that would control an articulating outboard motor bracket.

OBJECTS OF THE INVENTION

It is, therefore, an object of the present invention to provide an improved device that controls an articulating outboard motor bracket.

It is another object of the present invention to provide a device that assists in raising an articulating outboard motor bracket into a transit position and lowering the articulating outboard motor bracket into an operating position.

It is a further object of the present invention to provide a device that enables a user to control an articulating outboard motor bracket with a substantially small amount of physical effort.

It is yet a further object of the present invention to provide a device that secures an articulating outboard motor bracket in the operating position and secures an articulating outboard motor bracket in the transit position.

SUMMARY OF THE INVENTION

These and other objects and advantages of the present invention are achieved by providing a device for controlling an articulating outboard motor bracket. The present invention includes a mounting bracket that is affixed to an inner wall of a boat's transom. The mounting bracket includes a pair of mounting plates that extend above a top edge of the transom.

A lever arm has a first end that is pivotally coupled to the mounting plates and a second end that provides a handle portion. An arcuate portion is interposed between the first end and the second end. The arcuate portion causes the handle portion to form an angle of substantially 35 degrees with the longitudinal axis of the lever arm. A plastic grip may be slid over the handle portion to enhance gripping of the lever arm.

A lever member has an arcuate region that extends from a first end toward a second end thereof. The lever member's first end is pivotally coupled to the lever arm. The lever member couples to the lever arm at a point adjacent to the arcuate portion of the lever arm. A pair of coupling plates couple the lever member to the lever arm and hold the lever member in axial alignment with the lever arm. The first end of the lever member forms an angle of substantially 70 degrees with the longitudinal axis thereof, due to the arcuate region.

Connecting means are provided for pivotally connecting a second end of the lever member to a lifting member on the articulating bracket.

In use, the lever arm is pivoted toward the articulating bracket, to oscillate the lever member downward and lower the articulating bracket. As the bracket is lowered, an outboard motor mounted on the bracket is lowered into the water. The lever arm is pivoted toward the articulating bracket until the bracket locks in an operating position. When the bracket is in the operating position, the arcuate first end of the lever member is in substantial alignment with the longitudinal axis of the lever arm.

The articulating bracket is raised by pivoting the lever arm away from the bracket. As the lever arm is pivoted away from the bracket, the lever member raises the bracket to lift the motor out of the water. The lever arm is pivoted away from the bracket until the bracket locks in a transit position. When the device is in the transit position, the arcuate first end of the lever member forms a substantially continuous arc with the handle portion of the lever arm.

BRIEF DESCRIPTION OF THE DRAWINGS

The objects and features of the present invention, which are believed to be novel, are set forth with particularity in the appended claims. The present invention, both as to it's organization and manner of operation, together with further objects and advantages, may best be understood by reference to the following description, taken in connection with the accompanying drawings, in which:

Figure 6:
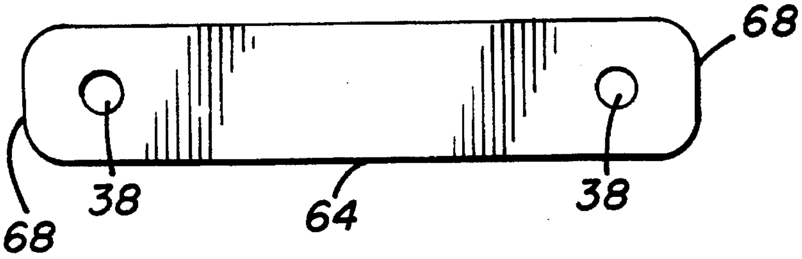
Figure 8:
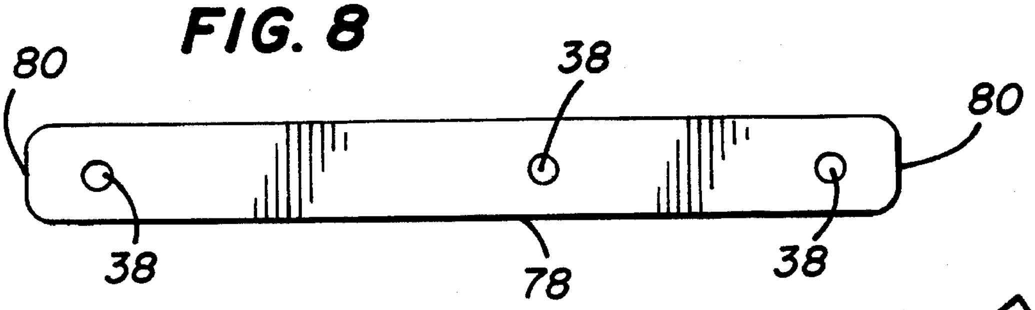

FIG..5 is a schematic plan view of showing a lever arm of the preferred embodiment;

FIG. 6 is a schematic plan view of showing a coupling plate of the present invention;

FIG. **7*a*** is a schematic plan view of showing angle iron of the preferred embodiment;

FIG. **7*b*** is a schematic side elevational view of showing angle iron of the preferred embodiment;

FIG. 8 is a schematic plan view of showing a mounting plate of the present invention; and FIGS. **9*a*–9*d*** are schematic side elevational views showing a series of operational steps of the preferred embodiment of the present invention.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for an improved device for controlling an articulating outboard motor bracket.

Figure 1:
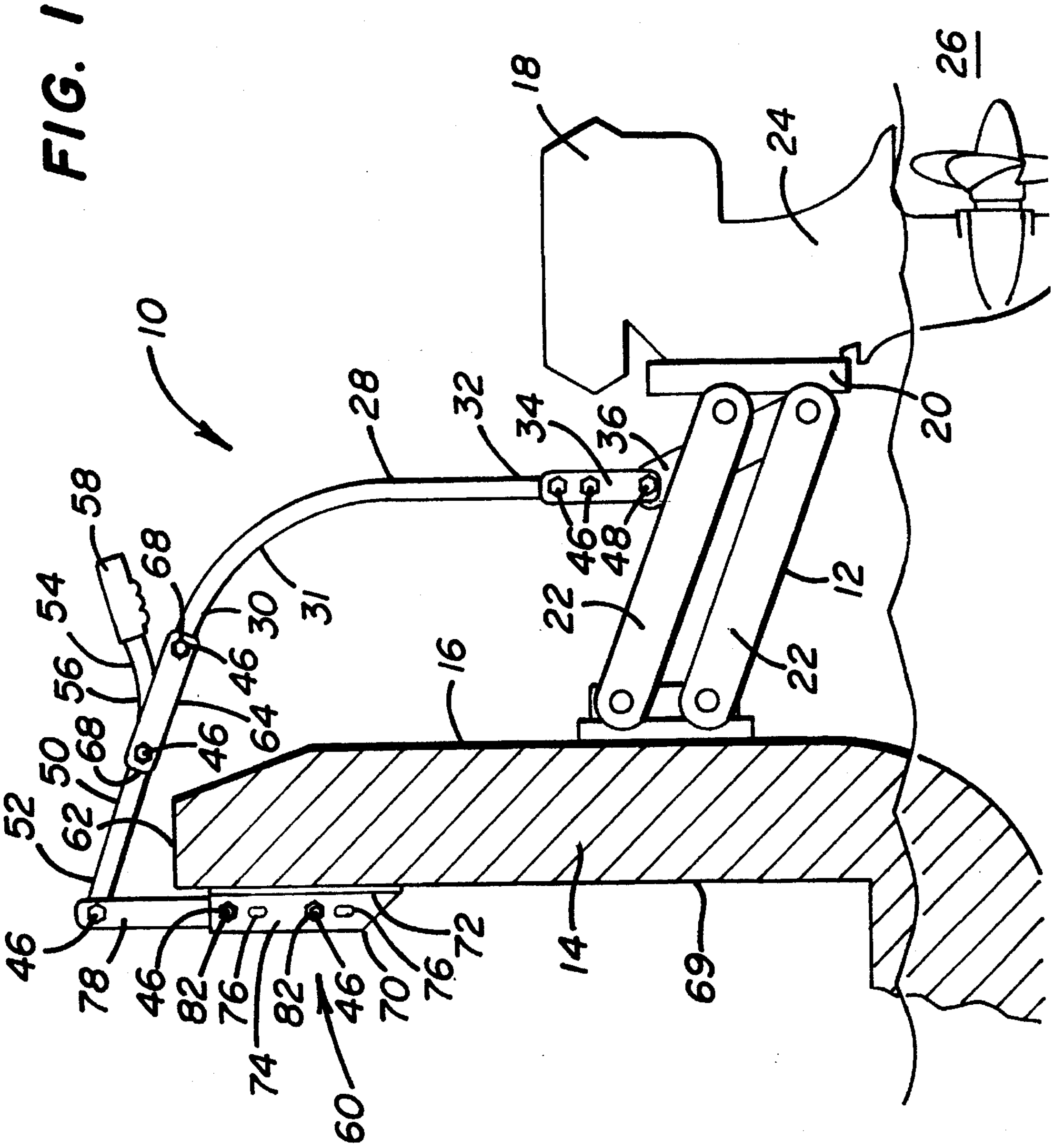
FIG. 1 is a schematic side elevational view of showing a preferred embodiment of the present invention coupled to an articulating outboard motor bracket in an operating position.
Figure 2:
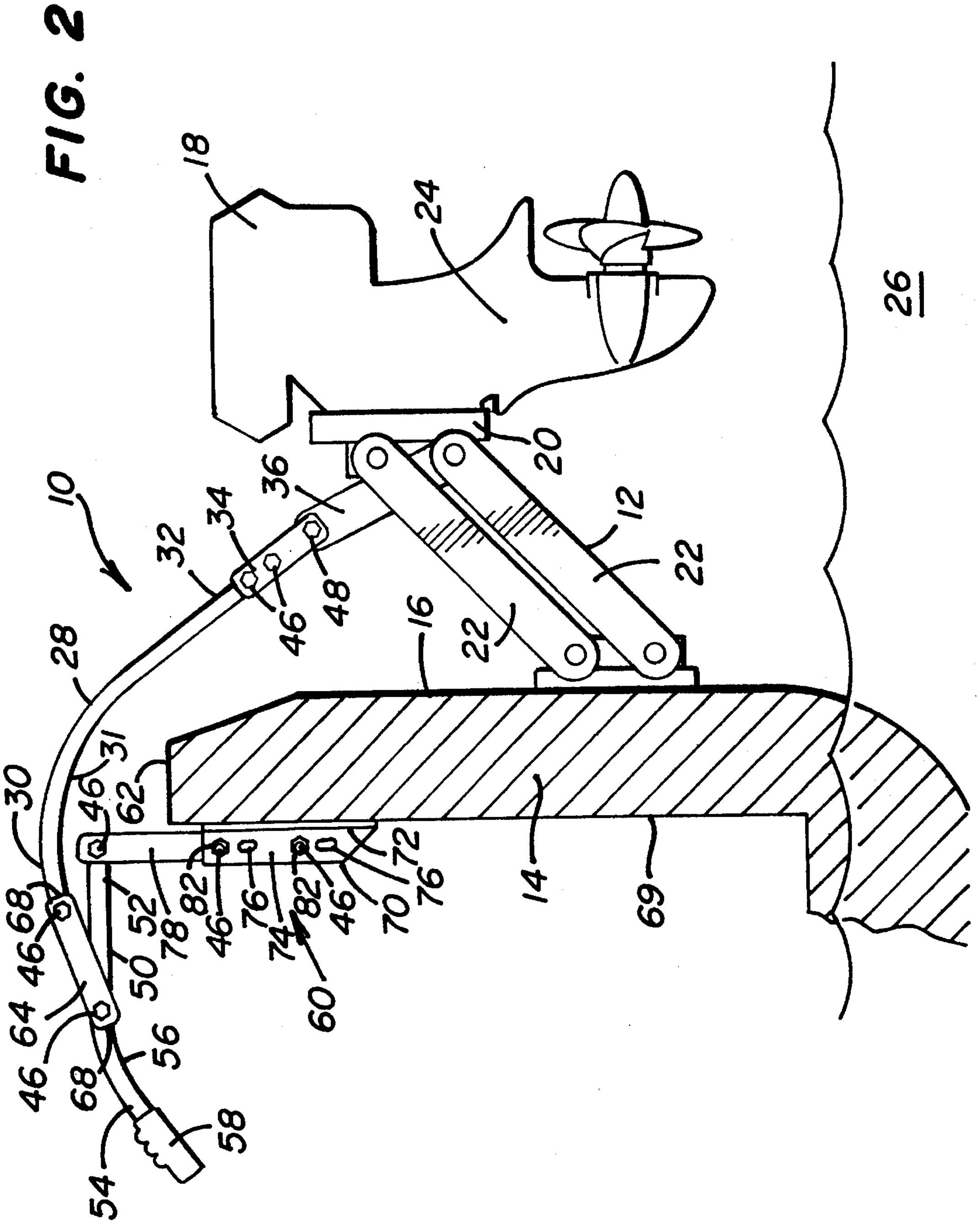
FIG. 2 is a schematic side elevational view of showing the preferred embodiment coupled to an articulating outboard motor bracket in a transit position.

Referring now to FIG. 1 and FIG. 2 of the drawings, there is shown a preferred embodiment of the device 10 of the present invention. The device 10 is shown coupled to an articulating outboard motor bracket 12 and mounted to a boat's transom 14. The articulating bracket 12 is affixed to an outer wall 16 of the transom 14 using well known means. An outboard motor 18 is attached to a motor mount 20 of the articulating bracket 12.

When arms 22 of the articulating bracket 12 are in a lowermost position, as shown in FIG. 1, the articulating bracket 12 is in an operating position. When the arms 22 are in an uppermost position, as seen in FIG. 2, the articulating bracket 12 is in a transit position. In the operating position, a shaft 24 of the motor 18 extends into water 26, so that motor 18 can operate properly. In the transit position, the articulating bracket 12 holds the motor's shaft 24 completely out of the water 26.

Referring now to FIGS. 1, 2 and. 3, the invented device 10 includes a lever member 28 that has first end 30 and a second end 32. An arcuate region 31 extends from the first end 30 toward the second end 32. The lever member 28 may comprise any suitable strong, light, corrosion resistant material. In the preferred embodiment, the lever member 28 comprises a hollow, cylindrical portion of stainless steel that is substantially 18 inches long and has a diameter of 0.75 inch. The lever member 28 may be fabricated in any suitable length to accommodate the height of the transom 14. The first end 30 of the lever member 28 forms an angle of substantially 70 degrees with the longitudinal axis there of, due to the arc of the arcuate region 31.

Figure 4:
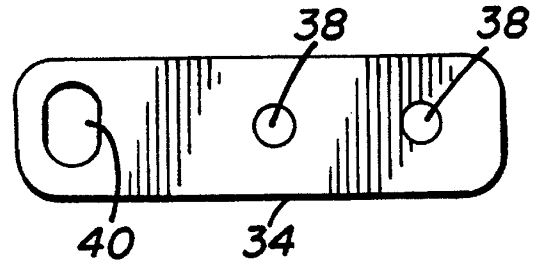
FIG. 4 is a schematic plan view of showing a connecting plate of the present invention.

Referring now to FIGS. 1, 2, and 4, a pair of connecting plates 34 pivotally connect the lever member's second end 32 to a lifting member 36 of the articulating bracket 12. The connecting plates 34 may comprise a suitable corrosion resistant metal, such as stainless steel, that is substantially 1 inch wide and 3.6 inches long, and 0.1 inch thick.

A pair of small openings 38 and an ovular opening 40 are disposed through each connecting plate 34. The openings 38, 40 are positioned in the plates 34, to ensure that the plates 34 are securely affixed to the lever member 28 and pivotally connected to the lifting member 36.

Figure 3:
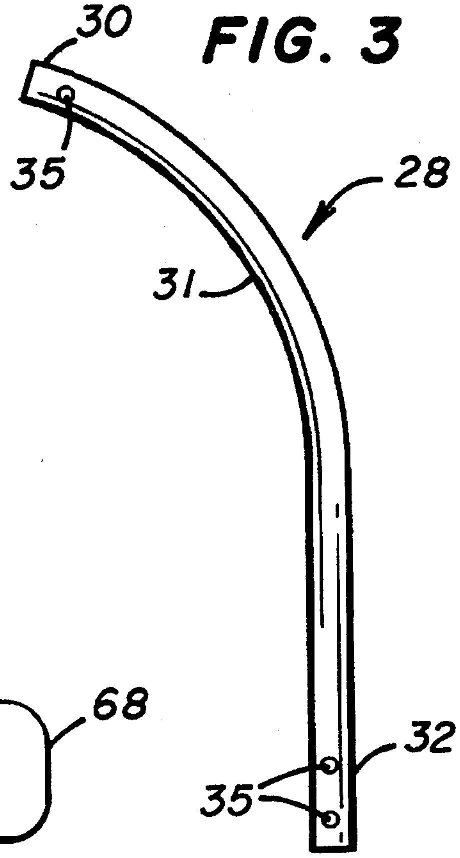
FIG. 3 is a schematic side elevational view of showing a lever member of the preferred embodiment.

The connecting plates 34 are affixed to the lever member 28, by first forming a pair of holes 35 (shown in FIG.3) in the lever member 28. The holes 35 extend perpendicular to the arcuate region 31 and complementary to the pair of small openings 38 in the connecting plates 34. The holes 35 are located adjacent to the lever member's second end 32. A bolt 46 is then disposed through each of the small openings 38 in a desired one of the connecting plates 34, through each hole 35 adjacent to lever member's second end 32, and through each small opening 38 in the remaining connecting plate 34. A nut (not shown) is then threaded onto the bolt 46 to affix the connecting plates 34 to the lever member's second end 32.

The connecting plates 34 are then pivotally connected to the articulating brackets lifting member 36. The plates 34 are connected to the lifting member 36 by first disposing a larger bolt 48 through the ovular opening 40 in one of the connecting plates 34, through an opening (not shown) in the lifting member 36, and through the ovular opening 40 in the remaining connecting plate 34. A nut is then threaded onto the bolt 48 to pivotally connect the connecting plates 34 to the articulating bracket's lifting member 36.

Figure 5:
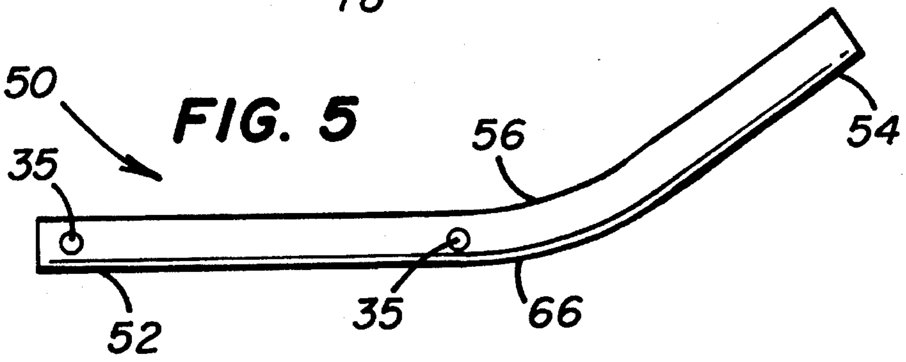
Figure 7A:
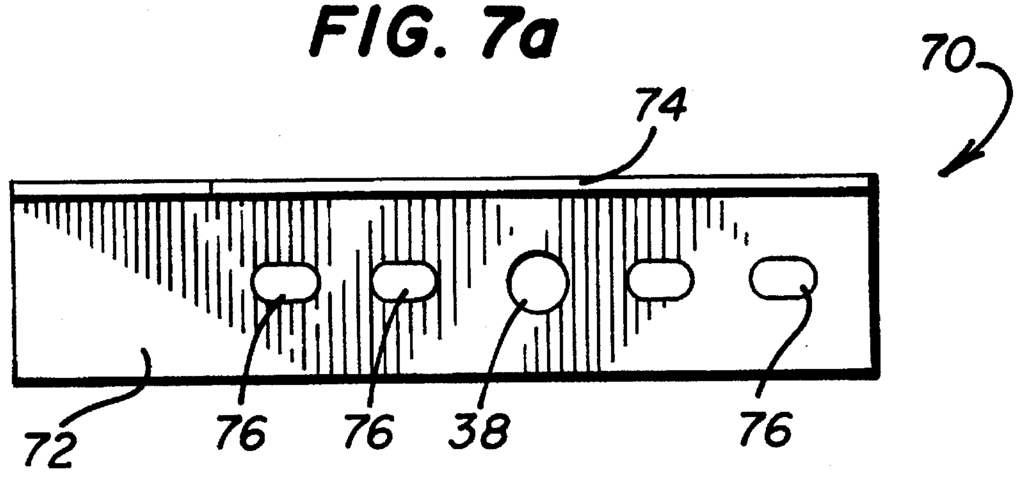
Figure 7B:
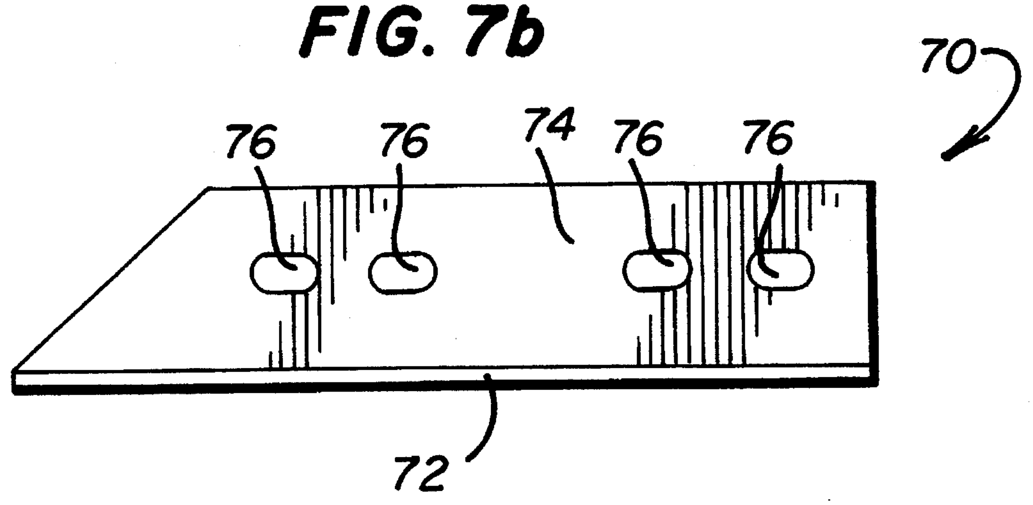

Referring now to FIGS. 1, 2, and 5, a lever arm 50 has a first end 52 that is pivotally coupled to a mounting bracket 60. A second end 54 of the lever arm 50 provides a handle portion. An arcuate portion 56 is interposed between the first end 52 and handle portion 54 thereof. The arcuate portion 56 causes the handle portion 54 to form an angle of substantially 35 degrees with the longitudinal axis of the lever member 50. A resilient grip 58 may be slid over the lever arm's handle portion 54 to enhance gripping of the lever arm 50. The grip 58 may comprise any suitable resilient material, such as plastic.

In the preferred embodiment, the lever arm 50 is substantially 13 inches in length and 0.75 inch in diameter, and comprises a hollow, cylindrical portion of stainless steel. The length of lever arm 50 may be any desirable length, where the arcuate portion 56 extends past a top edge 62 of the boat's transom 14 when the bracket 12 is in the operating position. When the articulating bracket 12 is in the operating position, the lever arm's handle portion 54 extends substantially parallel to the transom's top edge 62, to easily grasp the handle portion 54 for facile operation of the device 10.

Referring now to FIGS. 1, 2, and 6, the lever arm 50 is pivotally coupled to the lever member's first end 30. A pair of coupling plates 64 pivotally couple the lever member's first end 30 to the lever arm 50 at a coupling point 66 (shown in FIG. 5) interposed between the first end 52 and the arcuate portion 56 of the lever arm 50, and adjacent to the arcuate portion 56 thereof. The coupling plates 64 further hold the lever member 28 in axial alignment with the lever arm 50.

The coupling plates 64 may comprise stainless steel, for example, that is substantially 1 inch wide and 3.85 inches in length. A small opening 38 is located adjacent to each end 68 of the coupling plates 64 for receiving coupling means, such as a bolt 46 for example, to couple the lever member 28 to the lever arm 50.

The coupling plates 64 are affixed to the lever member's first end 30 by forming a hole 35 (shown in FIG. 3) in the lever member 28 complementary to the openings 38 in the plates 64. The hole 35 extends perpendicular to the arcuate region 31 and is disposed through the lever member 28, adjacent to the first end 30 thereof. A bolt 46 is then disposed through a desired opening 38, through the hole 35, and through the desired opening in the remaining coupling plate 64. A nut is then threaded onto the bolt 46 to secure the coupling plates 64 to the lever member 28.

The coupling plates 64 are pivotally coupled to the lever arm's coupling point 66 by first forming a hole 35, that extends perpendicular to the arcuate portion 56, through the coupling point 66. The coupling plates 64 are then pivotally coupled to the lever arm 50, by disposing a bolt 46 through the opening 38, and securing the plates 64 to the lever arm 50, using the previously discussed, methods.

Referring now to FIGS. 1, 2, 7*a*, 7*b* and 8, the mounting bracket 60 is affixed to an inner wall 69 of the transom 14. The mounting bracket 60 is positioned on the transom's inner wall 69 to prevent the lever arm 50 and lever member 28 from bearing against the top edge 62 of the transom 14. The mounting bracket 60 includes a pair of complementary portions of angle iron 70. The portions of angle iron 70 are spatially positioned on the transom's inner wall 69, so that the first end 52 of the lever arm 50 may be closely interposed therebetween. In the preferred embodiment 10, the portions of angle iron 70 comprise a base plate 72 that is substantially 6.8 inches in length and 1.5 inches wide, and an attachment plate 74. The attachment plate 74 extends perpendicular to the base plate 72 and is substantially 5.3 inches in length and 1.5 inches high. A plurality of ovular openings 76 are disposed through the base plate 72 and attachment plate 74. Bolts (not shown) may be disposed through the openings 76 to secure the mounting bracket's base plate 72 to the transom's inner wall 69. Bolts 46 are also used to attach a mounting plate 78 to each attachment plate 74. The ovular openings 76 provide for vertical adjustment of the mounting bracket 60 on the transom's inner wall 69 and between the attachment plates 74 and mounting plates 78.

Referring now to FIGS. 1, 2, and 8, a mounting plate 78 is affixed to each attachment plate 74. The mounting plates 78 include a small opening 38 located adjacent to each end 80 thereof, and a small opening 38 that is positioned proximal to the longitudinal center thereof. The mounting plates 78 are affixed to the attachment plates 74, by first disposing a bolt 46 through each of the closest two small openings 38 in the mounting plates 78, then disposing the bolts through the desired ovular openings 76 in the attachment plates 74. Nuts 82 are then threaded onto the bolts 46 to secure the mounting plates 78 to the attachment plates 74.

The lever arm's first end 52 is pivotally coupled to the mounting plates 78, by forming a hole 35 (shown in FIG. 5) in the lever arm 50 complementary to the openings 38 in the plates 78. The hole 35 extends perpendicular to the arcuate portion 56 and is disposed through the lever arm 50, adjacent to the first end 52 thereof. A bolt 46 is then disposed through the remaining opening 38, through the hole 35, and through the remaining opening in the remaining mounting plate 78. A nut is then threaded onto the bolt 46 to pivotally couple the plates 78 to the lever arm 50.

Figure 9B:
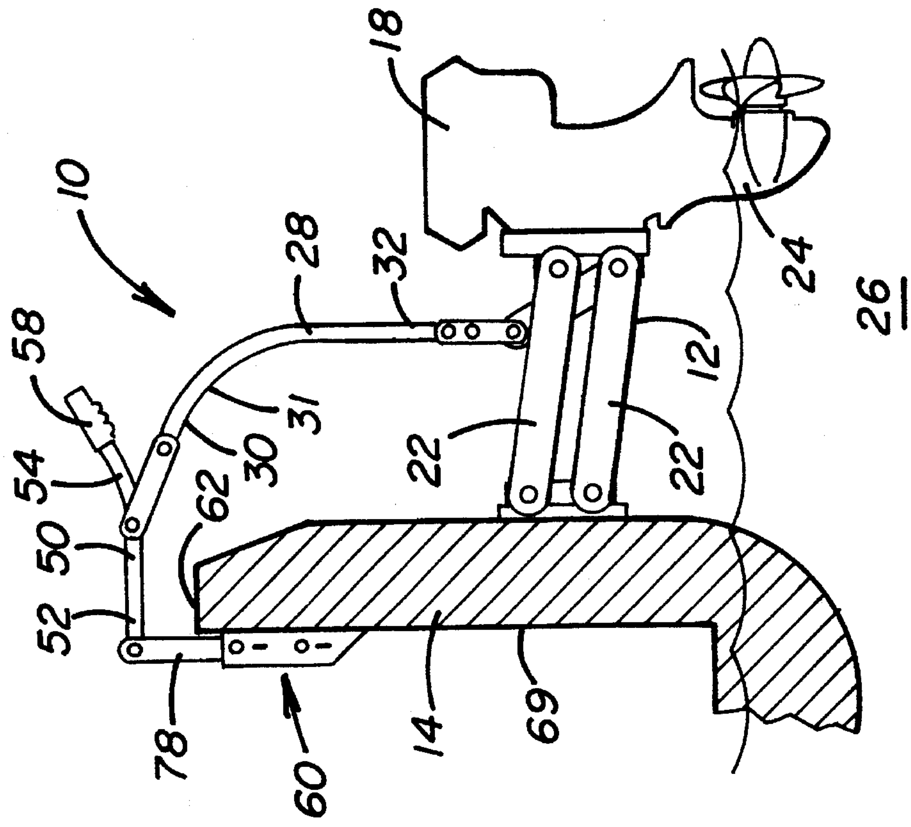
Figure 9A:
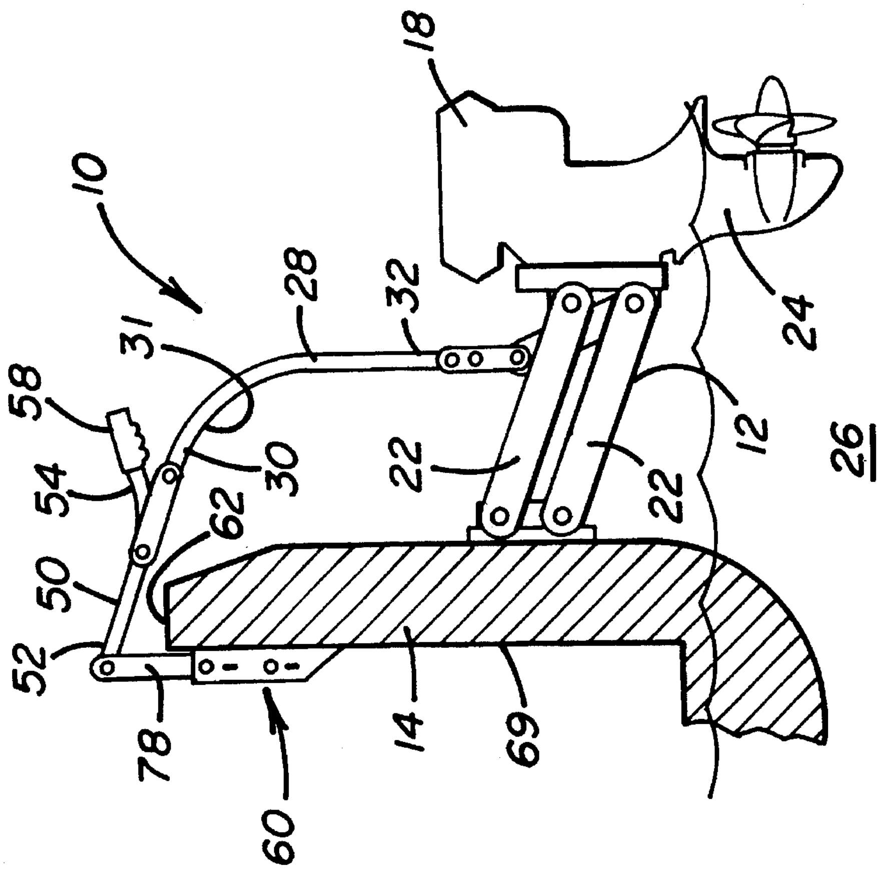
Figure 9D:
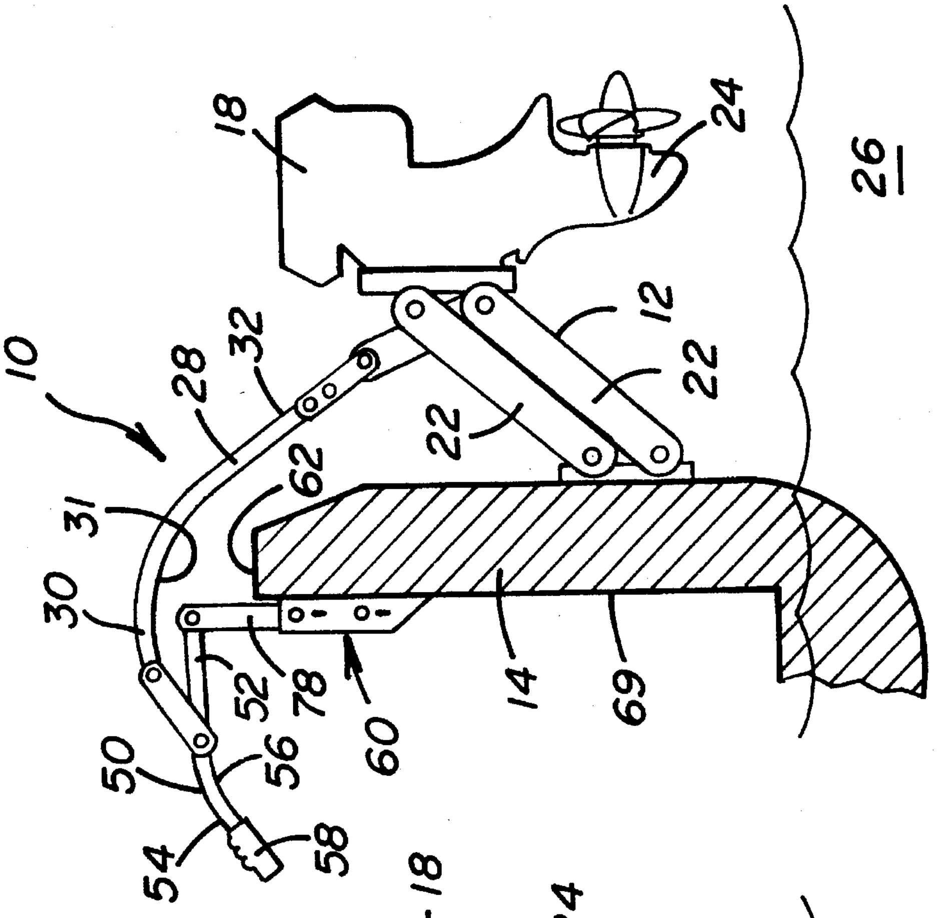
Figure 9C:
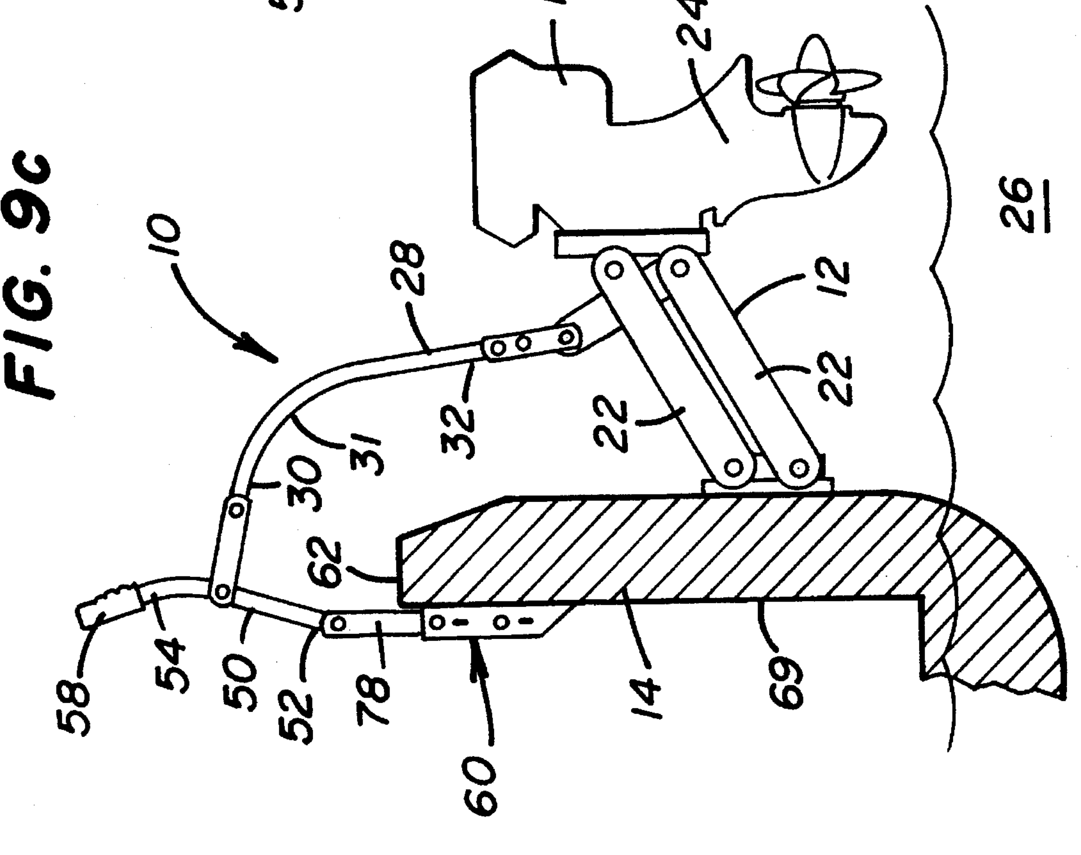

Referring now to FIGS. 9*a*, 9*b*, 9*c*, and 9*d*, there is shown a series steps for operating the invented device 10 to control the articulating bracket 12. FIG. 9*a* shows the articulating bracket 12 in the operating position. The arms 22 are in their lowermost position and the motor's shaft 24 is fully in the water 26, so that the outboard motor 18 can operate properly. When the articulating bracket 12 is in the operating position, the lever member's first end 30 is in substantial alignment with the longitudinal axis of the lever arm 50, due to the angle of the arc of the lever member's arcuate region 31. The substantial alignment of the lever member's first 30 with the lever arm 50, securely holds the bracket 12 in the operating position, to inhibit the bracket 12 from inadvertently raising.

The articulating bracket 12 is raised by first grasping the grip 58 affixed to the lever arm's handle portion 54, then pivoting the lever arm 50 away from the articulating bracket 12. As the lever arm 50 is pivoted away from the articulating bracket 12, the lever member 28 is drawn upward by the lever arm 50, to raise the bracket 12. As the bracket 12 is raised, the motor's shaft 24 is lifted out of the water 26. The coupling plates 64 hold the lever member 28 in substantial axial alignment with the lever arm 50 to provide facile operation of the invented device 10. The lever arm 50 is pivoted away from the bracket 12, until the bracket 12 locks in the transit position (shown in FIG. 9*d*). When the bracket 12 is in the transit position, the arcuate region 31 of the lever member 28 forms a substantially continuous arc with the handle portion 54 of the lever arm 50. Further, the first end 30 of the lever member 28 abuts the lever arm 50 to securely hold the bracket 12 in the transit position, to inhibit the bracket 12 from inadvertently lowering.

In the transit position, the motor's shaft 24 is completely out of the water 26 to reduce drag on the boat. The mounting bracket 60 is positioned on the transom's inner wall 69 so that the mounting plates 78 extend a substantial distance above the transom's top edge 62. The mounting plates 78 prevent the lever arm 50 and lever member 28 from bearing against the transom 14.

The articulating bracket 12 is lowered by pivoting the lever arm 50 toward the articulating bracket 12. As the lever arm 50 is pivoted toward the bracket 12, the lever arm 50 lowers the lever member 28 downward, to lower the articulating bracket 12. As the bracket 12 is lowered, the motor's shaft 24 is lowered into the water 26. The lever arm 50 is pivoted toward the articulating bracket 12 until the bracket 12 locks in the operating position. When the bracket 12 is in the operating position, the arcuate region 31 of the lever member 28 is in substantial alignment with the longitudinal axis of the lever arm 50.

Thus, there has been described an improved device for facile controlling of an articulating outboard motor bracket. The lever member is pivotally coupled to the articulating bracket. The lever arm pivotally couples to the lever member, so that the lever member may be vertically oscillated for facile controlling of the articulating bracket. The resilient grip on the lever arm's handle portion provides enhanced grasping of the lever arm. The angular relationship of the lever member's arcuate region and lever arm's longitudinal axis inhibits the articulating bracket from inadvertently being displaced from either the operating position or transit position, and further enhances the ease with which the device of the present invention can be operated.

Those skilled in the art will appreciate that various adaptations and modification of the just-described preferred embodiments can be configured without departing from the scope and spirit of the invention. Therefore, it is to be understood that, within the scope of the appended claims, the invention may be practiced other than as specifically described herein.

What is claimed is:

1. A device for controlling an articulating outboard motor bracket mounted on an outer wall of a transom of a boat, said device comprising:

a mounting bracket adapted to be affixed to an inner wall of said transom, said mounting bracket comprising first and second portions of angle iron adapted to be spatially affixed to said inner wall in a parallel relationship, and a pair of mounting plates affixed to said portions of angle iron and capable of extending above a top edge of said transom;

a hollow, rigid cylindrical lever arm with a longitudinal axis and having a first end and a second end, the first end of said lever arm pivotally affixed to said mounting plates, said lever arm having an arcuate portion interposed between the first end and second end thereof such that the second end of said lever arm forms an angle of substantially 35 degrees with the longitudinal axis thereof, the second end of said lever arm providing a handle portion, said lever arm dimensioned to extend over the top edge of said transom such that the handle portion thereof is positioned past the outer wall of said transom when said articulating bracket is in an operating position;

a hollow, rigid cylindrical lever member with a longitudinal axis and having an arcuate region extending from a first end towards a second end thereof, said lever member pivotally coupled to said lever arm at a point interposed between the first end and arcuate portion thereof and adjacent to the arcuate portion of said lever arm, the first end of said lever member forming an angle of substantially 70 degree with the longitudinal axis thereof, the arcuate region of said lever member in substantial longitudinal alignment with the longitudinal axis of said lever arm when said articulating bracket is in said operating position, the arcuate region of said lever member in substantial longitudinal alignment with the handle portion of said lever arm when said articulating bracket is in a transit position; and a pair of connecting plates pivotally connecting the second end of said lever member to a lifting member on said articulating bracket, whereby said lever arm is pivoted away from said articulating bracket to oscillate said lever member upward for raising said articulating bracket into said transit position, and said lever arm is pivoted toward said articulating bracket to oscillate said lever member downward to lower said articulating bracket into said operating position.

2. The device of claim 1 wherein said lever arm comprises portion of stainless steel.

3. The device of claim 1 wherein said lever member comprises a portion of stainless steel.

4. The device of claim 1 wherein said lever arm further includes a resilient hollow grip disposed over the handle portion of said lever arm.

5. The device of claim 1 wherein said portions of angle iron comprise stainless steel.

* * * * *